United States Patent
Kinoshita et al.

(10) Patent No.: US 6,910,730 B2
(45) Date of Patent: Jun. 28, 2005

(54) MOUNTING DEVICE FOR MOUNTING A CABLE-OPERATED WINDOW REGULATOR

(75) Inventors: Kimihiro Kinoshita, Kanagawa (JP); Satoshi Takeda, Tokyo (JP); Hideo Morita, Tokyo (JP)

(73) Assignees: Shiroki Corporation, Kanagawa-ken (JP); Hino Motors, Ltd., Tokyo (JP)

( * ) Notice: Subject to any disclaimer, the term of this patent is extended or adjusted under 35 U.S.C. 154(b) by 0 days.

(21) Appl. No.: 10/742,752

(22) Filed: Dec. 23, 2003

(65) Prior Publication Data

US 2004/0227376 A1 Nov. 18, 2004

(30) Foreign Application Priority Data

Dec. 25, 2002 (JP) .................................. 2002-374884
Dec. 25, 2002 (JP) .................................. 2002-374885

(51) Int. Cl.[7] .................................................. B60J 1/12
(52) U.S. Cl. .................. 296/146.16; 49/349; 49/352; 296/146.6; 296/146.7
(58) Field of Search .................. 296/146.16, 146.5, 296/146.2, 106, 190.1, 146.7, 146.6; 49/348, 349, 360, 361, 352, 451, 375

(56) References Cited

U.S. PATENT DOCUMENTS

| | | | | |
|---|---|---|---|---|
| 4,547,993 A | * | 10/1985 | Kobayashi et al. | 49/352 |
| 4,819,377 A | * | 4/1989 | Bauer et al. | 49/349 |
| 5,038,519 A | * | 8/1991 | Huebner | 49/349 |
| 5,070,648 A | * | 12/1991 | Moriyama | 49/352 |
| 5,159,781 A | * | 11/1992 | Glossop et al. | 49/375 |
| 5,430,977 A | * | 7/1995 | Kitayama et al. | 49/352 |
| 5,469,663 A | * | 11/1995 | TenBrink et al. | 49/352 |
| 5,581,947 A | * | 12/1996 | Kowall et al. | 49/451 |
| 5,617,675 A | * | 4/1997 | Kobrehel | 49/352 |
| 5,979,115 A | * | 11/1999 | Szerdahelyi et al. | 296/146.7 |
| 6,052,947 A | * | 4/2000 | Smith | 49/352 |
| 6,088,965 A | * | 7/2000 | Fukumoto et al. | 49/352 |
| 6,640,497 B2 | * | 11/2003 | Sakaguchi et al. | 49/352 |
| 2004/0227376 A1 | * | 11/2004 | Kinoshita et al. | 296/146.6 |

FOREIGN PATENT DOCUMENTS

| | | | |
|---|---|---|---|
| JP | 414582 | * | 4/1992 |
| JP | 2003328640 | * | 11/2003 |
| JP | 2004210079 | * | 7/2004 |

* cited by examiner

Primary Examiner—Kiran B. Patel
(74) Attorney, Agent, or Firm—Millen, White, Zelano & Branigan, P.C.

(57) ABSTRACT

A mounting device for mounting a cable-operated window regulator for a vehicle to an inner panel of the vehicle, the cable-operated window regulator includes a guide rail for guiding a window glass; a reversible winding unit for raising and lowering the window glass by winding and rewinding at least one cable which is wound on upper and lower guide members provided at upper and lower ends of the guide rail, respectively; upper and lower fixing member which are integrally formed with upper and lower ends of the guide rail, respectively; and a service hole formed on the inner panel. The lower fixing member is fixed to an outer surface of the inner panel near a lower edge of the service hole. The upper fixing member is fixed to an inner surface of the inner panel near an upper edge of the service hole.

11 Claims, 6 Drawing Sheets

MOUNTING DEVICE FOR MOUNTING A CABLE-OPERATED WINDOW REGULATOR

BACKGROUND OF THE INVENTION

1. Field of the Invention

The present invention relates to a mounting device for mounting a cable-operated window regulator for a vehicle which includes one or more cables for raising and lowering a window glass of a vehicle window such as a tailgate window, a back window or a side window, and is especially suitable for a tailgate window, a back window or a side window.

2. Description of the Related Art

In the case of mounting a cable-operated window regulator for vehicle which includes one or more cables for raising and lowering a window glass of a vehicle window such as a side window, a tailgate window or a back window to a side door, a tailgate or a back panel, none of the conventional mounting devices for mounting such a cable-operated window regulator are constructed to be capable of temporally mounting the window regulator before securely mounting the window regulator in place in a side door, a tailgate or a back panel. Accordingly, an improved mounting device for mounting the cable-operated window regulator which is capable of temporally mounting the window regulator to facilitate assembly is desirable.

When mounting the cable-operated window regulator onto a tailgate, the cable-operated window regulator is mounted to the tailgate with the tailgate already attached to a car body, rather than being mounted to the tailgate in a state before the tailgate is attached to a car body. On the other hand, when the cable-operated window regulator is mounted to a back panel for a back window, two people are used to perform a mounting operation in which the window regulator is mounted to the back panel from the outside of the vehicle without stepping into the vehicle for the sake of facilitating assembly. In each of these mounting operations in which the cable-operated window regulator is mounted to the tailgate or the back panel, it is conventionally the case that all the components of the window regulator are inserted into the space between an inner panel and an outer panel (exterior panel) of the tailgate or the back panel through a service hole formed on the inner panel. The cable-operated window regulator for the tailgate window or the back window of a vehicle is generally provided with a pair of guide rails which are bilaterally positioned to hold and guide a wide window glass in a direction to raise and lower the window glass. Since the pair of guide rails are relatively long, it is difficult to insert the pair of guide rails into the aforementioned space between the inner panel and the outer panel through the relatively small service hole of the inner panel. Accordingly, facilitating assembly of the cable-operated window regulator is desirable.

As described above, the cable-operated window regulator for a tailgate window or a back window of a vehicle is generally provided with a pair of guide rails which are bilaterally positioned to guide a wide window glass therebetween stably along the pair of guide rails. A winding unit bracket, to which a reversible winding unit including a reversible motor and a winding drum is fixed, is fixed to one of the pair of guide rails. One end and the other end of the window drive cable which is wound around the winding drum are connected to the window glass via upper and lower cable guide members (e.g., pulleys), which are positioned at the upper end of one guide rail and the lower end of the other guide rail, respectively.

In such a cable-operated window regulator for the tailgate window or the back window of a vehicle, it is difficult to ensure stability in the position of the reversible winding unit unless the rigidity of the winding unit bracket is increased because the distance between the pair of guide rails is great, and further because the winding unit bracket is fixed at one end thereof to one of the pair of guide rails to serve a cantilever bracket. Due to this structure, the conventional winding unit bracket is thick and heavy. Nevertheless, such a cantilever bracket cannot ensure a high stability in position of the reversible winding unit even if the thickness of the bracket is increased because the winding unit bracket is fixed at only one end thereof to one of the pair of guide rails.

In addition, in conventional cable-operated window regulators for a tailgate window or a back window of vehicle, the wiring harness for supplying power to the reversible winding unit may interfere with the window glass that moves up and down due to an unstable position of the wiring harness with respect to the reversible winding unit. In such conventional cable-operated window regulators for the tailgate window, it is difficult for the reversible winding unit or the winding unit bracket to be stably positioned by the inner panel of the tailgate because a service hole which is formed on the inner panel is generally large for facilitating assembly, and further because of an insufficient rigidity of the inner panel.

SUMMARY OF THE INVENTION

The present invention provides a mounting device for mounting a cable-operated window regulator for a vehicle which includes at least one guide rail, wherein the mounting device is constructed to facilitate assembly of the cable-operated window regulator.

The present invention provides a mounting device for mounting a cable-operated window regulator for vehicle which includes at least one guide rail, wherein opposite ends of the winding unit bracket of the mounting device can be supported with a simple structure to ensure stability in position of the reversible winding unit.

The present invention also provides a mounting device for mounting a cable-operated window regulator for a vehicle which includes at least one guide rail, wherein the mounting device is constructed to prevent the wiring harness for the reversible winding unit from interfering with a window glass with a simple structure.

The inventors of the present invention reconsidered the conventional idea that a guide rail or a pair of guide rails of a cable-operated window regulator for vehicle must be inserted into a side door, a tailgate or a back panel of the vehicle through a service hole formed on an inner panel of the side door, the tailgate or the back panel, and have developed the present invention in view of the idea that assembly of the cable-operated window regulator is facilitated if the upper end of each guide rail is positioned on the vehicle's interior side of the inner panel, i.e., outside the space between the inner panel and the outer panel of the side door, the tailgate or the back panel.

According to an aspect of the present invention, a mounting device for mounting a cable-operated window regulator for a vehicle to an inner panel of the vehicle is provided, the cable-operated window regulator including at least one guide rail for guiding a window glass; a reversible winding unit for raising and lowering the window glass by winding and rewinding at least one cable which is wound on an upper guide member and a lower guide member, the upper guide member and the lower guide member being provided at an upper end and a lower end of the guide rail, respectively; an upper fixing member and a lower fixing member which are integrally formed with an upper end and an lower end of the guide rail, respectively; and a service hole formed on the inner panel. The lower fixing member is fixed to an outer surface of the inner panel in the vicinity of a lower edge of the service hole. The upper fixing member is fixed to an inner surface of the inner panel in the vicinity of an upper edge of the service hole.

With this structure, assembly of the cable-operated window regulator is facilitated because the upper fixing member can be fixed to the inner surface (surface on the vehicle's interior side) of the inner panel from the inside of the vehicle with the upper fixing member contacting the inner surface of the inner panel if the lower fixing member is inserted into a certain space (i.e., space between the inner panel and the outer panel of a tailgate, a back panel or a side door of the vehicle) through the service hole to be fixed to the outer surface of the inner panel while the upper fixing member is fixed to the inner surface of the inner panel.

It is desirable for the guide rail to extend down to a position below the service hole. The length of the guide rail in a vertical direction is limited by the size (height) of the service hole because the upper fixing member at the upper end of the guide rail is fixed to the inner surface of the inner panel, which is positioned on the vehicle's interior side.

It is desirable for the upper fixing member and the lower fixing member to include an upper bracket and a lower bracket which support the upper guide member and the lower guide member, respectively. It is desirable for at least one temporary-mount engaging portion, via which the upper bracket can be temporarily mounted to the inner surface of the inner panel, to be formed on at least one of the upper bracket and the inner panel, the temporary-mount engaging portion being provided independently of a fixing device for permanently fixing the guide rail to the inner panel. This single-piece construction makes a further reduction in production cost of the mounting device possible, and facilitates assembly of the cable-operated window regulator.

It is desirable for the inner surface of the inner panel, to which the upper fixing member is fixed, to be positioned closer to the outside of the vehicle than the outer surface of the inner panel, to which the lower fixing member is fixed. This arrangement eases the installation of the guide rail through the service hole. In addition, this arrangement does not make the installation of the guide rail through the service hole difficult even if the guide rail extends down to a point below the service hole.

The inner panel can serve as an inner panel of a tailgate, a back panel or a side door, the guide rail being positioned in a space between the inner panel and an outer panel of one of the tailgate, the back panel and the side door.

It is desirable for the reversible winding unit to include a reversible motor and a winding drum around which the cable is wound.

It is desirable for the upper guide member and the lower guide member to include a pulley.

The temporary-mount engaging portion can be at least one hole which is formed in the inner panel, wherein a portion of the upper bracket can be engaged in the hole.

The outer surface of the inner panel can constitute an outer surface of at least one lower lug which projects inwards, toward the service hole, and the inner surface least one upper lug which projects inwards, toward the service hole.

The guide rail can be a pair of guide rails.

The fixing device can be at least one bolt and a corresponding at least one weld nut.

In another embodiment, a mounting device for mounting a cable-operated window regulator for a vehicle to an inner panel of a tailgate is provided, the inner panel having at least one service hole and being positioned inside an outer panel of the tailgate, the cable-operated window regulator including at least one guide rail which extends over the service hole, and guides a window glass so as to be movable up and down in a space between the inner panel and the outer panel; and a reversible winding unit, fixed to the guide rail, for raising and lowering the window glass by winding and rewinding at least one cable which is wound on an upper guide member and a lower guide member, the upper guide member and the lower guide member being provided at an upper end and a lower end of the guide rail, respectively. The lower fixing member is fixed to an outer surface of the inner panel in the vicinity of a lower edge of the service hole. The upper fixing member is fixed to an inner surface of the inner panel in the vicinity of an upper edge of the service hole.

According to another aspect of the present invention, a mounting device for mounting a cable-operated window regulator for a vehicle to an inner panel of the vehicle is provided, at least one service hole being formed in the inner panel, the cable-operated window regulator including at least one guide rail, fixed to the inner panel through the service hole, for guiding a window glass; a reversible winding unit for raising and lowering the window glass by winding and rewinding at least one cable which is wound on an upper guide member and a lower guide member, the upper guide member and the lower guide member being positioned at an upper end and a lower end of the guide rail, respectively; at least one vertical bar fixed to the inner panel in a manner so as to divide the service hole into at least two service holes which are horizontally positioned side by side; and a winding unit bracket which supports the reversible winding unit, wherein opposite ends of the winding unit bracket are fixed to the guide rail and the vertical bar, respectively.

It is desirable for the winding unit bracket to include a harness holding portion for holding a wiring harness extending from the reversible winding unit.

The harness holding portion can be formed as a protrusion of the winding unit bracket, and can include an engaging hole in which a harness holder which holds the wiring harness is engaged.

It is desirable for the inner panel to serve as an inner panel of a tailgate, a back panel or a side door, the guide rail being positioned in a space between the inner panel and an outer panel of one of the tailgate, the back panel and the side door.

It is desirable for the reversible winding unit to include a reversible motor and a winding drum around which the cable is wound.

It is desirable for each of the upper guide member and the lower guide member to include a pulley.

The guide rail can be a pair of guide rails between which the vertical bar is positioned.

In another embodiment, a mounting device for mounting a cable-operated window regulator for a vehicle to an inner panel of a tailgate is provided, the inner panel having at least one service hole and being positioned inside an outer panel of the tailgate, the cable-operated window regulator including a guide rail, fixed to the inner panel to extend over the service hole, for guiding a window glass so as to be movable up and down in a space between the inner panel and the outer panel; a vertical bar fixed to the inner panel adjacent to the guide rail to extend over the service hole; a winding unit bracket, opposite ends of which are fixed to the guide rail and the vertical bar, respectively; and a reversible winding unit, fixed to the winding unit bracket, for raising and lowering the window glass by winding and rewinding at least one cable which is wound on an upper guide member and a lower guide member, the upper guide member and the lower guide member being provided at an upper end and a lower end of the guide rail, respectively.

The present disclosure relates to subject matter contained in Japanese Patent Applications Nos. 2002-374884 and 2002-374885 (both filed on Dec. 25, 2002) which are expressly incorporated herein by reference in their entireties.

BRIEF DESCRIPTION OF THE DRAWINGS

The invention will be discussed below in detail with reference to the accompanying drawings, in which:.

DESCRIPTION OF THE PREFERRED EMBODIMENT

Figure 6:
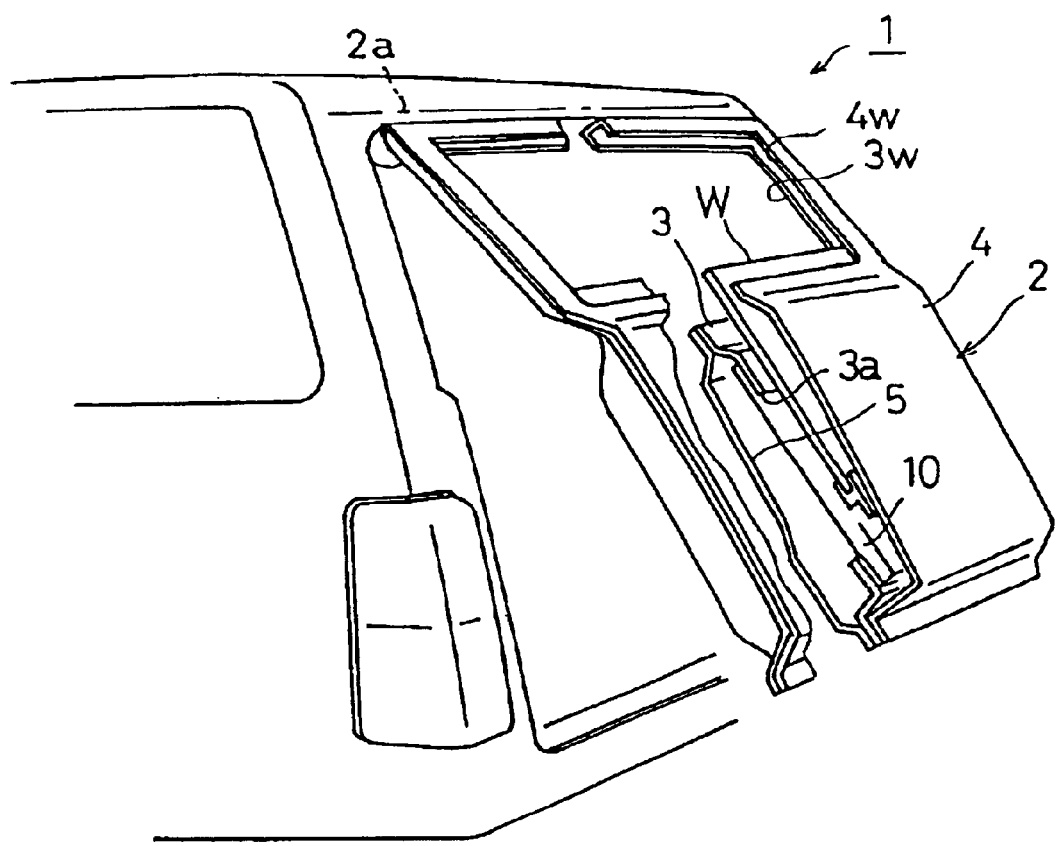
FIG. 6 is a perspective view, partially in cross section, of the rear of the vehicle to which the tailgate is pivoted.
Figure 7:
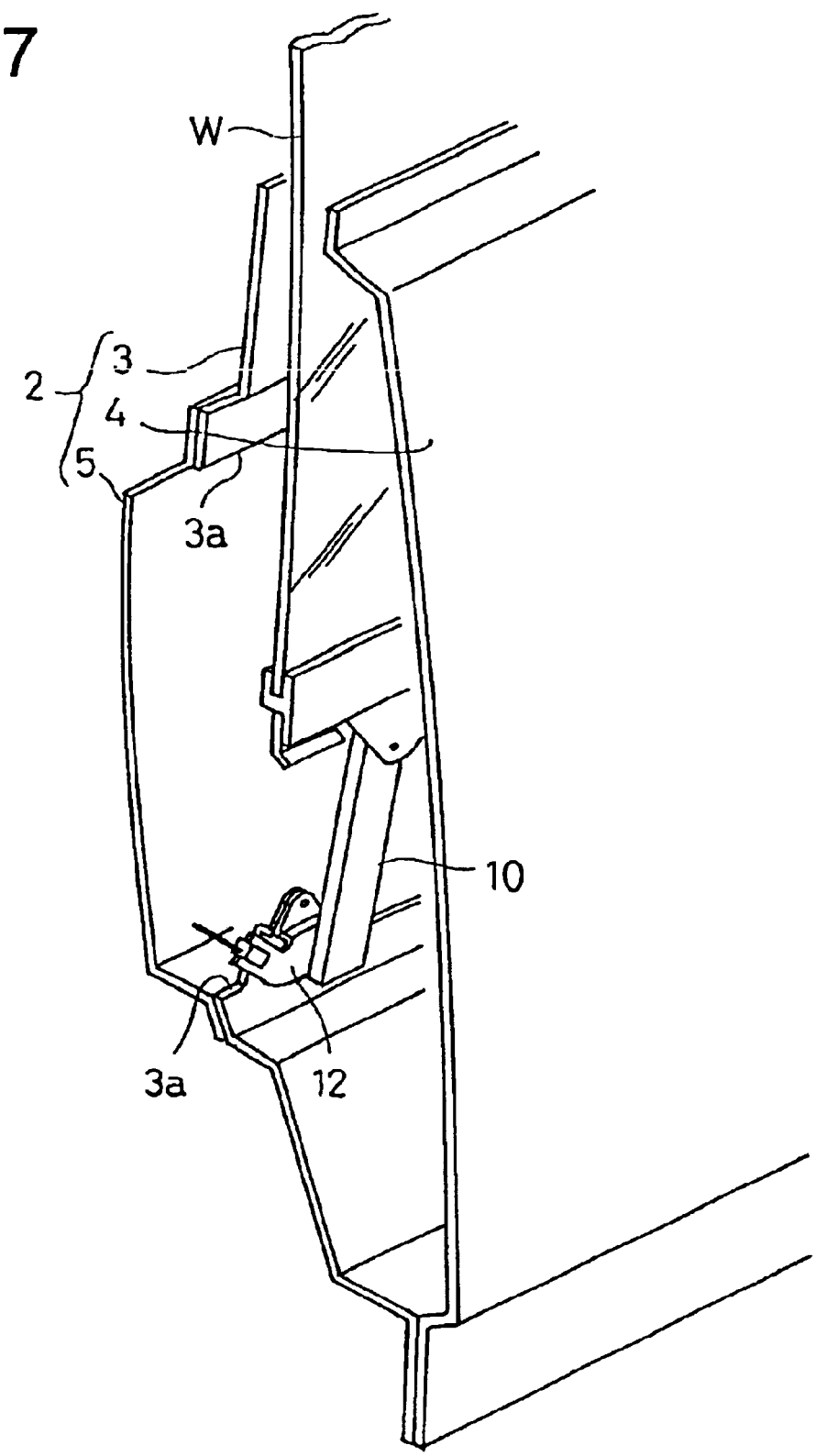
FIG. 7 is a cutaway view in perspective of the tailgate shown in FIG. 6.

An embodiment of a mounting device for mounting a cable-operated window regulator for a vehicle, according to the present invention, which is applied to a tailgate at the rear end of the vehicle will be discussed hereinafter. As shown in FIGS. 6 and 7, a tailgate 2 which forms a rear part of a vehicle 1 is pivoted on a horizontal pivot (door opening/closing shaft) 2a (shown by a one-dot chain line in FIG. 6) positioned along an upper edge of the rear opening of the vehicle 1. The tailgate 2 is provided with an inner panel 3, an upper end of which is pivoted at the horizontal pivot 2a, and an outer panel 4 which is fixed to the inner panel 3. A cable-operated window regulator is provided between thee inner panel 3 and the outer panel 4, which includes a pair of parallel guide rails 10 for holding and guiding a window glass W. An inner opening 3w and an outer opening 4w which form a window opening of the tailgate 2 are formed on the inner panel 3 and the outer panel 4, respectively (see FIG. 6).

Figure 1:
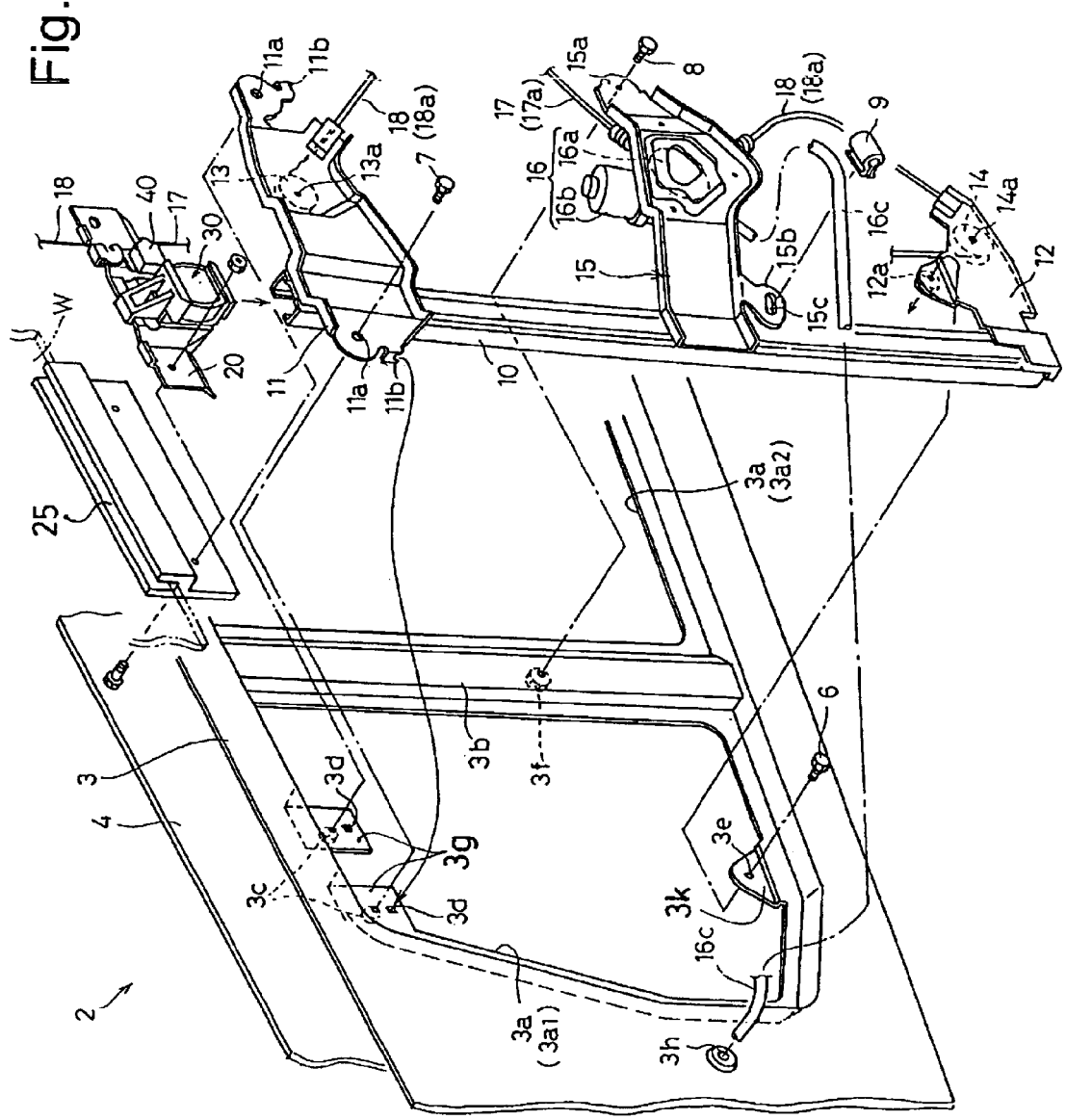
FIG. 1 is an exploded perspective view of an embodiment of a cable-operated window regulator for vehicle which is provided with a mounting device for mounting the cable-operated window regulator according to the present invention in a state before components of the window regulator are fixed to an inner panel of a tailgate.
Figure 2:
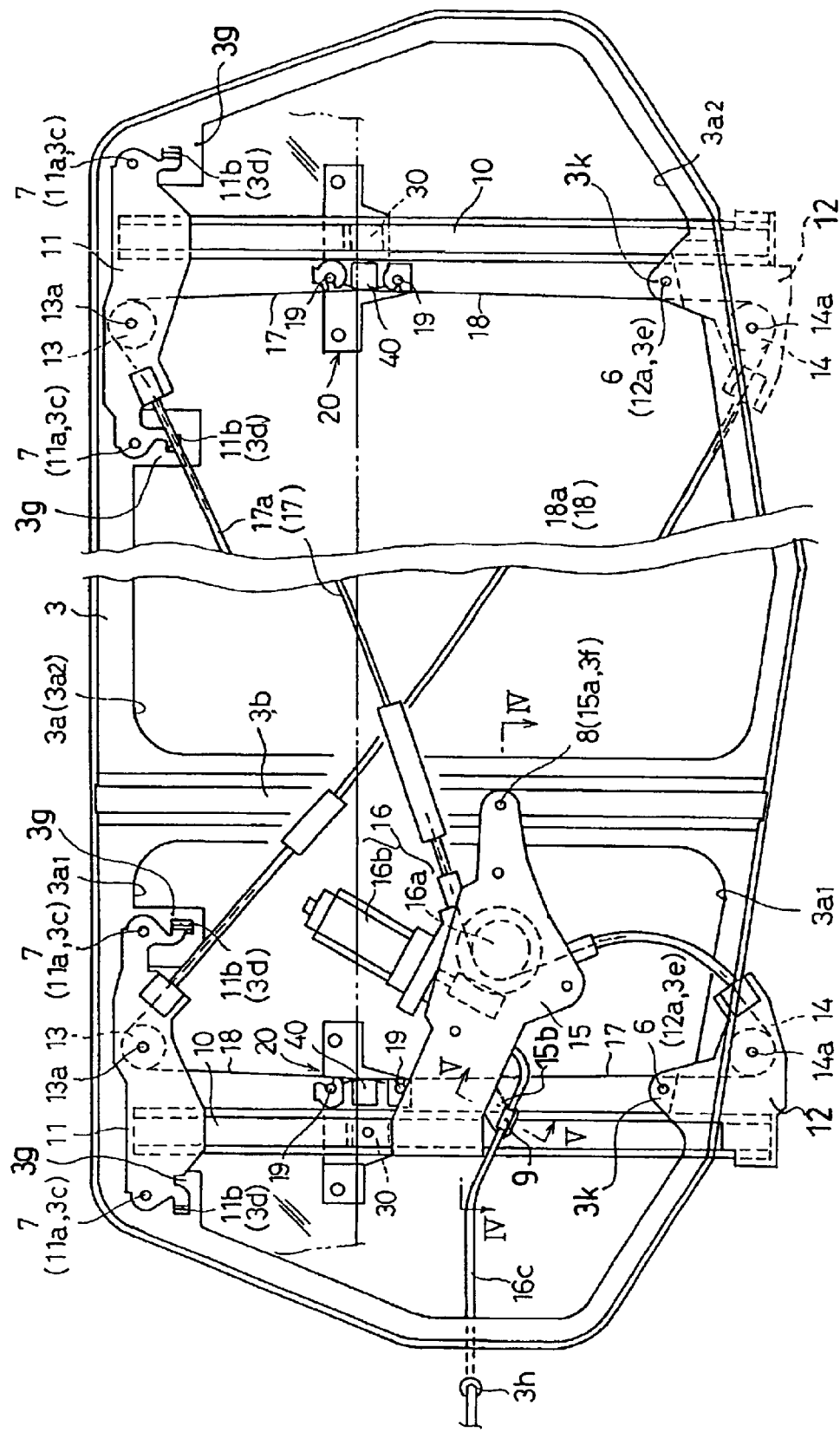
FIG. 2 is a front elevational view of the cable-operated window regulator, showing a state where the cable-operated window regulator has been mounted to the inner panel of the tailgate.
Figure 3:
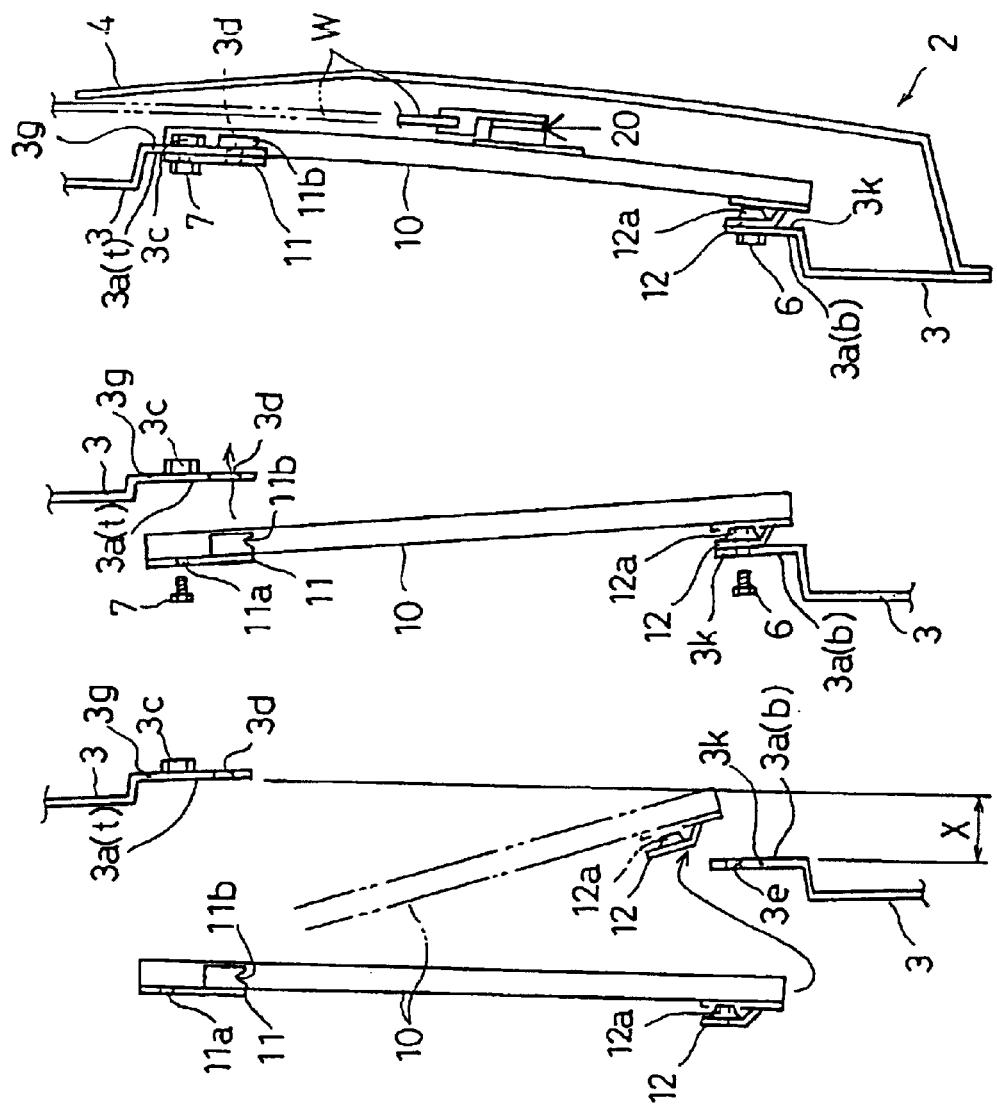
FIGS. 3A, 3B and 3C are diagrams showing the procedure of mounting the cable-operated window regulator to the inner panel of the tailgate.

As shown in FIGS. 1 and 2, the pair of guide rails 10 of the cable-operated window regulator are fixed to the inner panel 3 to extend in a longitudinal direction of the tailgate 2 and to be bilaterally positioned apart from each other in a widthwise direction of the tailgate 2. The cable-operated window regulator is provided with a pair of sliders 30 which are engaged with the pair of guide rails 10 to be slidably guided thereby along a longitudinal direction of the pair of guide rails 10, respectively. A pair of horizontally-elongated slider bases 20 are fixed to outer surfaces of the pair of sliders 30, respectively, while the lower edge of the window glass W is fixed to outer surfaces of the pair of slider bases 20 via a pair of holder members 25 (only one of them appears in FIG. 1) (see FIG. 4).

The cable-operated window regulator is provided at upper and lower ends of each guide rail 10 with an upper bracket (upper fixing member) 11 and a lower bracket (lower fixing member) 12, respectively. The upper bracket 11 and the lower bracket 12 are welded to the upper and lower ends of each guide rail 10, respectively. An upper guide pulley (upper cable guide member) 13 is provided on each upper bracket 11 to be freely rotatable on a pin 13a fixed to the upper bracket 11, while a lower guide pulley (lower cable guide member) 14 is provided on each lower bracket 12 to be freely rotatable on a pin 14a fixed to the lower bracket 12. All the four guide pulleys 13a and 14a are positioned inwardly between the pair of guide rails 10.

The cable-operated window regulator is provided with a winding unit bracket 15 which is welded at one end thereof to one of the pair of guide rails 10 (the left guide rail 10 as viewed in FIG. 1). A reversible winding unit 16 which includes a winding drum 16a and a reversible motor 16b is fixed to a middle portion of the winding unit bracket 15. The cable-operated window regulator is provided with two window drive cables for raising and lowering the window glass W: a first drive cable 17 and a second drive cable 18. The first drive cable 17 is wound around the winding drum 16a, and one end of the first drive cable 17 is connected to the left slider base 20 via the lower guide pulley 14, fixed at the lower end of the left guide rail 10, while the other end of the first drive cable 17 is connected to the right slider base 20 via the upper guide pulley 13, fixed to the upper end of the right guide rail 10 as viewed in FIG. 2. One end of the second drive cable 18 is connected to the left slider base 20 via the upper guide pulley 13, fixed to the upper end of the left guide rail 10, while the other end of the second drive cable 18 is connected to the right slider base 20 via the lower guide pulley 14, fixed to the lower end of the right guide rail 10 as viewed in FIG. 2. Accordingly, in the present embodiment of the cable-operated window regulator, the first drive cable 17 and the second drive cable 18 intersect each other in the shape of a cross (X) between the pair of guide rails 10. It is desirable that the first drive cable 17 be composed of two cables: a first cable extending between the left slider base 20 and the winding drum 16a, and a second cable extending between the right slider base 20 and the winding drum 16a.

As shown in FIGS. 1 through 3C, the inner panel 3 of the tailgate 2 is provided with two service holes 3a (a left service hole 3a1 and a right service hole 3a2) used for the installation of the cable-operated window regulator. The inner panel 3 is provided between the two service holes 3a with a vertical bar 3b which is formed integral with the inner panel 3. Accordingly, the two service holes 3a are partitioned by the vertical bar 3b to serve as the left service hole 3a1 and the right service hole 3a2. The inner panel 3 is provided on upper and lower sides of the two service holes 3a with an upper side edge 3a(t) and a lower side edge 3a(b), respectively. As clearly shown in FIGS. 3A through 3C, the upper side edge 3a (t) is positioned closer to the rear of the vehicle 1 (i.e., to the outerpanel 4) than the lower side edge 3a(b). In other words, the upper side edge 3a (t) is offset rearward from a plane in which the lower wide edge 3a(b) lies. The amount of this offset is shown by "X" in FIG. 3A.

Figure 4:
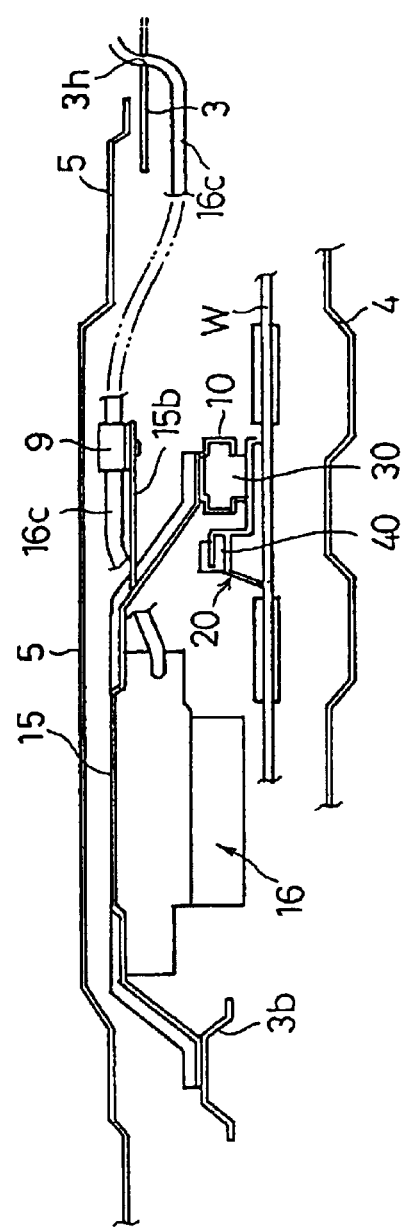
FIG. 4 is a cross sectional view taken along IV—IV line shown in FIG. 2.

A trim panel 5 for closing the service hole 3a of the inner plane 3 is fixed to an inner surface (surface on the vehicle's interior side) of the inner plate 3 after the installation of the cable-operated window regulator through the two service holes 3a (see FIGS. 4 and 6).

The left guide rail 10 and the right guide rail 10 are inserted into the tailgate 2 through the left service hole 3a1 and the right service hole 3a2, respectively. Each upper bracket 11 and each lower bracket 12 are also used to serve as an upper fixing member and a lower fixing member, respectively, for fixing the associated left or right guide rail 10 to the tailgate 2 (specifically, to the inner panel 3).

To this end, two bolt insertion holes 11a are made on horizontally opposite ends of each upper bracket 11, and each upper bracket 11 is provided with two temporary hanger projections 11b which are press-formed below the two bolt insertion holes 11a, respectively. On the other hand, the inner panel 3 is provided with two pairs of upper lugs 3g which project inwardly (downwards as viewed in FIG. 2), toward the two service holes 3a (3a1 and 3a2), from the upper side edge 3a(t) of the left service hole 3a1 and the upper side edge 3a(t) of the right service hole 3a2, respectively. Each pair of upper lugs 3g are provided on outer surfaces thereof (surfaces adjacent to the outer panel 4) with two weld nuts 3c which are welded thereto and positioned to correspond to the two bolt insertion holes 11a of the left upper bracket 11 and the two bolt insertion holes 11a of the right upper bracket 11, respectively. Each pair of upper lugs 3g are further provided with two temporary catching holes (temporary-mount engaging portions) 3d which are formed so that the two temporary hanger projections 11b of each upper bracket 11 can be engaged in the two temporary catching holes 3d on the associated pair of upper lugs 3g, respectively. Although each upper bracket 11 is provided with the two temporary hanger projections 11b while the upper side edge 3a(t) of the inner plate 3 is provided for each upper bracket 11 with the two temporary catching holes 3d in the above illustrated embodiment of the cable-operated window regulator, each upper bracket 11 can be provided with only one temporary hanger projection 11b and the upper side edge 3a(t) can be provided for each upper bracket 11 with only one temporary catching hole 3d. Specifically, one of the pair of guide rails 10 (which is to be temporarily mounted to the inner plate 3 via the associated upper bracket 10 after the other guide rail 10 is temporarily mounted to the inner plate 3 via the other upper bracket 10) is prevented from swinging unintentionally by the first and second window drive cables 17 and 18 which extend from the other guide rail 10. Accordingly, each upper bracket 11 can be provided with only one temporary hanger projection 11b while the upper side edge 3a(t) can be provided for each upper bracket 11 with only one temporary catching hole 3d.

The inner panel 3 is provided with two lower lugs 3k which project inwardly (upwards as viewed in FIG. 2), toward the two service holes 3a (3a1 and 3a2), from the lower side edge 3a(b) of the left service hole 3a1 and the lower side edge 3a(b) of the right service hole 3a2, respectively. Each lower bracket 12 is provided on an outer surface thereof with a weld nut 12a which is welded thereto. On the other hand, a bolt insertion hole 3e is made on each lower lug 3k to correspond to the weld nut 12a of the associated lower bracket 12. The vertical bar 3b is provided an outer surface thereof with a weld nut 3f (see FIG. 1) which is welded thereto, while a bolt insertion hole 15a is provided on a free end portion (right end portion as viewed in FIG. 2) of the winding unit bracket 15 which is positioned to correspond to the weld nut 3f.

When the pair of guide rails 10 are inserted into the tailgate 2 through the two service holes 3a (3a1 and 3a2), respectively, firstly the lower end of each guide rail 10 is inserted into the tailgate 2 (into the space between the inner panel 3 and the outer panel 4) through the associated service hole 3a (3a1 or 3a2) as shown by a two-dot chain line in FIG. 3A. At this time, the lower bracket 12 of each guide rail 10 is inserted into the tailgate 2 at the same time. Subsequently, the two temporary hanger projections 11b of each upper bracket 11 are engaged in the two temporary catching holes 3d of the associated pair of upper lugs 3g; this operation temporarily mounts each guide rail 10 to the inner panel 3. This temporary mounting of the pair of guide rails 10 makes it possible for the workers to release their hands from the pair of guide rails 10, thus making the subsequent fixing operation in which the pair of guide rails 10 are fixed to the inner panel 3 with bolts easier. In addition, each bolt insertion hole 11a and the associated weld nut 3c are aligned in a state where the pair of guide rails 10 are temporarily mounted to the inner panel 3 by engagement of the temporary hanger projections 11b with the temporary catching holes 3d in the above described manner. This further facilitates the subsequent fixing operation in which the pair of guide rails 10 are fixed to the inner panel 3 with bolts.

Subsequently, in a state where the pair of guide rails 10 are temporarily mounted to the inner panel 3 by engagement of the temporary hanger projections 11b with the temporary catching holes 3d, a fixing bolt 6 is inserted into each bolt insertion hole 3e from the interior side thereof (left end as viewed in FIGS. 3A through 3C) to be screwed into the associated weld nut 12a to be fixed thereto. Accordingly, the pair of lower brackets 12 are respectively fixed to the outer surfaces (right surfaces as viewed in FIGS. 3A through 3C) of the pair of lower lugs 3k (of the inner panel 3). The term "outer surface" herein refers to a surface which is facing in a direction towards the outside of the outer panel 4, i.e., on the same side as the outer surface of the outer panel 4. In this fixed state, the lower end of each guide rail 10 extends down to a point sufficiently below the associated service hole 3a1 or 3a2.

Subsequently, the pair of upper brackets 11 are respectively brought into contact with inner surfaces (left surfaces as viewed in FIGS. 3A through 3C) of the pair of upper lugs 3g (of the inner panel 3), while a fixing bolt 7 is inserted into each bolt insertion hole 11a from the interior side thereof (left end as viewed in FIGS. 3A through 3C) to be screwed into the associated weld nut 3c to be fixed thereto. The term "inner surface" herein refers to a surface which is facing in a direction towards the inside of the outer panel 4, i.e., on the same side as the inner surface of the outer panel 4. Such a construction facilitates the fixing of the pair of upper brackets 11 to the inner panel 3 with the fixing bolts 7 because the fixing bolts 7 can be screwed down from the inside of the vehicle with each upper bracket 11 contacting with an inner surface of the inner panel 3 (inner surfaces of the associated pair of upper lugs 3g). On the other hand, although the length of each guide rail 10 in a vertical direction is limited by the size (height) of the associated service hole 3a (3a1 or 3a2), each guide rail 10 can easily secure a sufficient effective length by the above described structure wherein the lower end of each guide rail 10 extends down to a point sufficiently below the associated service hole 3a1 or 3a2. Additionally, each guide rail 10 and the lower bracket 11 thereof can be easily inserted into the tailgate 2 because the upper side edge 3a(t) is positioned closer to the rear of the vehicle 1 (i.e., to the outer panel 4) than the lower side edge 3a(b). This makes it possible to insert the pair of guide rails 10, which has a relatively long stroke for raising and lowering the window glass W, into the tailgate 2 even if the heights of the two service holes 3a1 and 3a2 are limited in the vertical direction of the tailgate 2.

During above described operation of fixing the pair of guide rails 10 to the inner panel 3, or after this fixing operation is completed, a fixing bolt 8 is inserted into the bolt insertion hole 15a, and is screwed into the weld nut 3f on the vertical bar 3b to fix the free end portion of the winding unit bracket 15 to the vertical bar 3b. Due to this structure wherein the free end portion of the winding unit bracket 15 is fixed to the vertical bar 3b, opposite ends of the winding unit bracket 15 are respectively supported by the left guide rail 10 and the vertical bar 3. This prevents the winding unit bracket 15 from wobbling even if the winding unit bracket 15 is small and lightweight, thus reliably preventing the winding unit bracket 15 from interfering with the window glass W. In addition, the rigidity of the inner panel 3 is increased by such a structure supporting opposite ends of the winding unit bracket 15. Specifically, the inner panel 3, the pair of guide rails 10 and the vertical bar 3b form a frame structure (ladder structure) providing greater rigidity in the inner panel 3; moreover, the structure fixing opposite ends of the winding unit bracket 15 to middle portions of the left guide rail 10 and the vertical bar 3b, respectively, further increases the rigidity of the inner panel 3.

Figure 5:
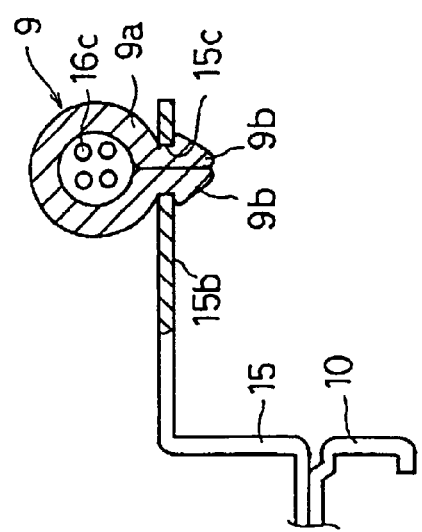
FIG. 5 is a cross sectional view taken along V—V line shown in FIG. 2.

A wiring harness 16c for supplying power to the reversible winding unit 16 extends from the reversible winding unit 16, and is routed to the outside of the tailgate 2 through a grommet (through hole) 3h formed on the inner panel 3 in the vicinity of a left edge of the left service hole 3a1 (see FIGS. 1 and 2). The winding unit bracket 15 is provided with a harness holding protrusion 15b which holds a harness holder 9. The harness holder 9 directly holds the wiring harness 16c. An engaging hole 15c is formed on the harness holding protrusion 15b. The harness holder 9 is provided with an openable ring portion 9a which is fitted on the wiring harness 16c, and a pair of self-locking engaging projections 9b which project from opposite ends of the openable ring portion 9a (see FIGS. 4 and 5). The harness holder 9 which is fitted on the wiring harness 16c is fixed to the harness holding protrusion 15b with the pair of self-locking engaging projections 9b being engaged in the engaging hole 15c. This structure wherein the wiring harness 16c, which extends from the reversible winding unit 16, is held by the harness holding protrusion 15b via the harness holder 9 reliably prevents the wiring harness 16c from interfering with the window glass W which moves up and down.

The present invention can be applied not only to a mounting device for mounting a cable-operated window regulator for a tailgate window of the tailgate of a vehicle, but also to a mounting device for mounting a cable-operated window regulator for any other window of a vehicle such as a back window of a back panel or a side window of a side door.

A pair of guide rails which are bilaterally positioned are used in the above described embodiment of the cable-operated window regulator. This is due to the fact that a relatively wide window glass such as a tailgate window glass or a back window glass can be held with stability by a pair of guide rails rather than a single guide rail. However, the cable-operated window regulator can be provided with only one guide rail.

The temporary-mount engaging portions (the temporary catching holes 3d) can be formed on an inner panel of a car body as needed.

Although a service hole formed on an inner panel of a tailgate or a back panel of a vehicle which includes a large sliding back window glass (such as the window glass W of the above described embodiment) which is driven by a cable-operated window regulator is inevitably large, the rigidity of the inner panel can be increased according to the present invention.

As can be understood from the foregoing, according to an aspect of the present invention, assembly of a cable-operated window regulator to an inner panel of a vehicle is facilitated because the lower fixing member at the lower end of each guide rail is fixed to an outer surface of the inner panel in the vicinity of a lower edge of a service hole made on the inner panel while the upper fixing member at the upper end of the guide rail is fixed to an inner surface of the inner panel in the vicinity of an upper edge of the service hole.

According to another aspect of the present invention, the winding unit bracket can be prevented from wobbling, and accordingly, can be prevented from interfering with the window glass even if the winding unit bracket is small and lightweight because a service hole formed on the inner panel of, e.g., a tailgate, is divided into at least two service holes which are horizontally positioned side by side by at least one vertical bar while a winding unit bracket is fixed at opposite ends thereof to one guide rail and one vertical bar, respectively. In addition, a wiring harness which extends from the reversible winding unit fixed to the winding unit bracket can be easily prevented from interfering with the window glass if the winding unit bracket is provided with a harness holding portion for holding the wiring harness. Additionally, if this harness holding portion is formed as a protrusion of the winding unit bracket, any extra parts are not necessary to be provided. Furthermore, the overall rigidity of the inner panel 3 is increased by a combination of the aforementioned frame structure (ladder structure) that is composed of the inner panel 3, the pair of guide rails 10 and the vertical bar 3 and the structure, wherein opposite ends of the winding unit bracket 15 are fixed to middle portions of the left guide rail 10 and the vertical bar 3b, respectively.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A mounting device for mounting a cable-operated window regulator for a vehicle to an inner panel of said vehicle, said cable-operated window regulator comprising:
   at least one guide rail for guiding a window glass;
   a reversible winding unit for raising and lowering said window glass by winding and rewinding at least one cable which is wound on an upper guide member and a lower guide member, said upper guide member and said lower guide member being provided at an upper end and a lower end of said guide rail, respectively;
   an upper fixing member and a lower fixing member which are integrally formed with an upper end and an lower end of said guide rail, respectively; and
   a service hole formed on said inner panel;
   wherein said lower fixing member is fixed to an outer surface of said inner panel in the vicinity of a lower edge of said service hole; and
   wherein said upper fixing member is fixed to an inner surface of said inner panel in the vicinity of an upper edge of said service hole.

2. The mounting device according to claim 1, wherein said guide rail extends down to a position below said service hole.

3. The mounting device according to claim 1, wherein said upper fixing member and said lower fixing member comprise an upper bracket and a lower bracket which support said upper guide member and said lower guide member, respectively, and wherein at least one temporary-mount engaging portion, via which said upper bracket can be temporarily mounted to said inner surface of said inner panel, is formed on at least one of said upper bracket and said inner panel, said temporary-mount engaging portion being provided independently of a fixing device for permanently fixing said guide rail to said inner panel.

4. The mounting device according to claim 1, wherein said inner surface of said inner panel, to which said upper fixing member is fixed, is positioned closer to the outside of said vehicle than said outer surface of said inner panel, to which said lower fixing member is fixed.

5. The mounting device according to claim 1, wherein said inner panel serves as an inner panel of one of a tailgate, a back panel and a side door, said guide rail being positioned in a space between said inner panel and an outer panel of one of said tailgate, said back panel and said side door.

6. The mounting device according to claim 1, wherein said reversible winding unit comprises a reversible motor and a winding drum around which said cable is wound.

7. The mounting device according to claim 1, wherein each of said upper guide member and said lower guide member comprises a pulley.

8. The mounting device according to claim 3, wherein said temporary-mount engaging portion comprises at least one hole which is formed in said inner panel, wherein a portion of said upper bracket can be engaged in said hole.

9. The mounting device according to claim 1, wherein said outer surface of said inner panel constitutes an outer surface of at least one lower lug which projects inwards, toward said service hole, and wherein said inner surface of said inner panel constitutes an inner surface of at least one upper lug which projects inwards, toward said service hole.

10. The mounting device according to claim 1, wherein said guide rail comprises a pair of guide rails.

11. The mounting device according to claim 3, wherein said fixing device comprises at least one bolt and a corresponding at least one weld nut.

\* \* \* \* \*

UNITED STATES PATENT AND TRADEMARK OFFICE
CERTIFICATE OF CORRECTION

PATENT NO.      : 6,910,730 B2                                                  Page 1 of 1
DATED           : June 28, 2005
INVENTOR(S)     : Kimihiro Kinoshita et al.

It is certified that error appears in the above-identified patent and that said Letters Patent is hereby corrected as shown below:

Title page,
Item [75], Inventors, delete "Hideo Morita, Tokyo (JP)".

Signed and Sealed this

Eighteenth Day of October, 2005

JON W. DUDAS
*Director of the United States Patent and Trademark Office*